United States Patent
Agarwal et al.

(10) Patent No.: US 12,023,815 B2
(45) Date of Patent: Jul. 2, 2024

(54) METHOD AND SYSTEM FOR AUTOMATED OBJECT PACKING

(71) Applicant: Tata Consultancy Services Limited, Mumbai (IN)

(72) Inventors: Marichi Agarwal, Kolkata (IN); Chayan Sarkar, Kolkata (IN); Swagata Biswas, Kolkata (IN); Sayan Paul, Kolkata (IN); Himadri Sekhar Paul, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 290 days.

(21) Appl. No.: 17/136,650

(22) Filed: Dec. 29, 2020

(65) Prior Publication Data
US 2021/0283776 A1 Sep. 16, 2021

(30) Foreign Application Priority Data
Feb. 12, 2020 (IN) .............................. 202021006123

(51) Int. Cl.
*B25J 9/16* (2006.01)
*B65G 1/137* (2006.01)

(52) U.S. Cl.
CPC ............ *B25J 9/1676* (2013.01); *B25J 9/161* (2013.01); *B25J 9/1653* (2013.01); *B25J 9/1692* (2013.01); *B65G 1/1371* (2013.01); *B65G 1/1373* (2013.01)

(58) Field of Classification Search
CPC ..... B25J 9/00; B25J 9/16; B25J 9/1602; B25J 9/1628; B25J 9/1674; B25J 9/1679;
(Continued)

(56) References Cited

U.S. PATENT DOCUMENTS

| | | | |
|---|---|---|---|
| 9,315,344 B1* | 4/2016 | Lehmann | B65B 59/001 |
| 10,679,379 B1* | 6/2020 | Diankov | B65G 47/90 |
| 2017/0213089 A1* | 7/2017 | Chen | G06V 20/10 |
| 2021/0129333 A1* | 5/2021 | Kanunikov | B25J 9/1666 |

OTHER PUBLICATIONS

Duan, Lu, "A Multi-task Selected Learning Approach for Solving 3D Flexible Bin Packing Problem", Computer Science, Mathematics, 2019, ARXIV, https://arxiv.org/pdf/1804.06896.pdf.
Martello, S., "Algorithm 864: General and robot-packable variants of the three-dimensional bin packing problem", ACM Transactions on Mathematical Software, 2007, ACM, https://www.researchgate.net/publication/220492665_Algorithm_864_General_and_robot-packable_variants_of_the_three-dimensional_bin_packing_problem/link/0912f4ff6ed782b122000000/download.
(Continued)

*Primary Examiner* — Khoi H Tran
*Assistant Examiner* — Sarah A Tran
(74) *Attorney, Agent, or Firm* — FINNEGAN, HENDERSON, FARABOW, GARRETT & DUNNER LLP

(57) ABSTRACT

Any technical error with robotic arms that are used to automatically perform object packing can affect quality and efficiency with which the packing is being carried out, and this in turn affects space utilization when a large quantity of objects are to be accommodated in tight packing spaces. This disclosure relates generally to automated object packing and more specifically to an object packing mechanism in which corrections are made when placement of object is identified as violating one or more regulations. The system packs objects by calculating ICP-BCP pairs for each empty space in a packing space. After packing each object, the system checks whether placement of the object violates one or more regulations, and if any violation is found, then the system determines and executes one or more corrective action to correct placement of the object that violates the regulation.

9 Claims, 9 Drawing Sheets

(58) Field of Classification Search
CPC ........ B25J 9/1676; B25J 9/161; B25J 9/1653;
B25J 9/1692; B65G 1/00; B65G 1/02;
B65G 1/04; B65G 1/137; B65G 1/1371;
B65G 1/1373; G06Q 10/00; G06Q 10/04;
G06Q 10/08; G06Q 10/083; G06Q
10/0832; G06Q 10/043; G06Q 50/00;
G06Q 50/28
USPC ...................................................... 700/255
See application file for complete search history.

(56) References Cited

OTHER PUBLICATIONS

Li, Kuan-Lin et al., "An optimization technique for identifying robot manipulator parameters under uncertainty", Computer Science, 2016, NCBI, https://springerplus.springeropen.com/articles/10.1186/s40064-016-3417-5.

Shih, Ching-Long et al., "A Simple Robotic Eye-In-Hand Camera Positioning and Alignment Control Method Based on Parallelogram Features", Robotics, 2018, MDPI, https://www.mdpi.com/2218-6581/7/2/31.

Shome, Rahul et al, "Towards Robust Product Packing with a Minimalistic End-Effector", Computer Science, 2019, ARXIV, https://arxiv.org/pdf/1903.00984.pdf.

* cited by examiner

METHOD AND SYSTEM FOR AUTOMATED OBJECT PACKING

PRIORITY CLAIM

This U.S. patent application claims priority under 35 U.S.C. § 119 to: India Application No. 202021006123, filed on Feb. 12, 2020. The entire contents of the aforementioned application are incorporated herein by reference.

TECHNICAL FIELD

The disclosure herein generally relates to object packing, and, more particularly, to a method and system for automated object packing using a robotic arm.

BACKGROUND

In places such as warehouses, object packing is performed before sending out objects to different locations. While packing objects in a box/bin, the objects are to be arranged such that available space is to be utilized efficiently. There are different object packing scenarios. In one scenario, all the objects are of the same size and shape. In another scenario, there may be some extent of mix of objects of different size and shape. In yet another scenario, the heterogeneity is more. When the heterogeneity is more, packing becomes more complex.

The inventors here have recognized several technical problems with such conventional systems, as explained below. Some methods and systems for performing the packing of objects exist. Some of the state of the art systems rely on concept of 'corner points (CP)', wherein the 'corner points' are coordinates in a residual space of the bin. The CP based systems have the disadvantage that they do not find out all feasible coordinates where the object can be placed, which affects the efficiency of the overall process. Some other state of the art mechanisms requires the objects to be turned upside down during the packing. However, if the objects being packed are of fragile nature, turning the objects upside down may result in the objects cracking or breaking. Another disadvantage of the existing mechanisms is that due to mechanical errors with the robotic arms placement of the objects may not be accurate, which in turn may affect accuracy of the object packing.

SUMMARY

Embodiments of the present disclosure present technological improvements as solutions to one or more of the above-mentioned technical problems recognized by the inventors in conventional systems. For example, in one embodiment, a processor-implemented method for bin packing is disclosed. Initially, an object list is fetched as input, using one or more hardware processors, wherein the object list comprises a plurality of objects and one or more characteristics of each of the plurality of objects. Further, one or more objects to be packed from among the plurality of objects, in a packing space, are determined using the one or more hardware processors, based on the one or more characteristics of each of the objects. Further, a primary placement sequence for the one or more objects to be packed in the packing space is generated, using the one or more hardware processors. The one or more objects are packed based on the primary placement sequence, using the one or more hardware processors. Further, a safety score is determined for the packing of each of the one or more objects, using the one or more hardware processors. If the determined safety score for any of the objects is less than a threshold of safety score, then a corrective action is initiated and executed using the one or more hardware processors, wherein the corrective action corrects placement of the object in the packing space.

In another aspect, a system for bin packing is provided. The system includes one or more communication interfaces, one or more hardware processors, and a memory (102) storing a plurality of instructions. The plurality of instructions when executed, cause the one or more hardware processors to fetch an object list as input, wherein the object list comprises a plurality of objects and one or more characteristics of each of the plurality of objects. Further, the system determines one or more objects from the among the plurality of objects as objects to be packed in a packing space, based on the one or more characteristics of each of the objects. Further, the system generates a primary placement sequence for the one or more objects to be packed in the packing space. The system then packs the one or more objects based on the primary placement sequence. The system further determines a safety score for the packing of each of the one or more objects. If the determined safety score for any of the objects is less than a threshold of safety score, then a corrective action is initiated and executed by the system, wherein the corrective action corrects placement of the object in the packing space.

In yet another aspect, a non-transitory computer readable medium for bin packing is disclosed. The non-transitory computer readable medium includes a set of instructions, which when executed, cause one or more hardware processors to perform steps involved in the process of bin packing. In this process, initially an object list is fetched as input, using the one or more hardware processors, wherein the object list comprises a plurality of objects and one or more characteristics of each of the plurality of objects. Further, one or more objects to be packed from among the plurality of objects, in a packing space, are determined using the one or more hardware processors, based on the one or more characteristics of each of the objects. Further, a primary placement sequence for the one or more objects to be packed in the packing space is generated, using the one or more hardware processors. The one or more objects are packed based on the primary placement sequence, using the one or more hardware processors. Further, a safety score is determined for the packing of each of the one or more objects, using the one or more hardware processors. If the determined safety score for any of the objects is less than a threshold of safety score, then a corrective action is initiated and executed using the one or more hardware processors, wherein the corrective action corrects placement of the object in the packing space.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
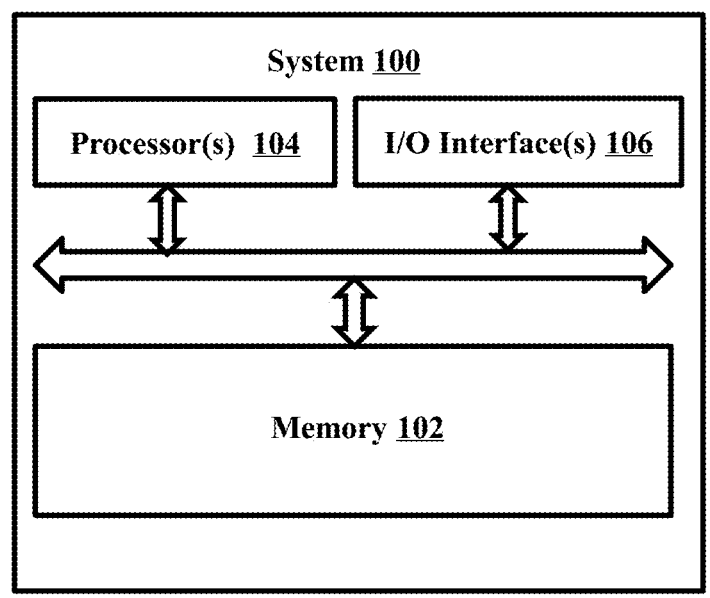
FIG. 1 illustrates an exemplary system for object packing, according to some embodiments of the present disclosure.

FIG. 1 illustrates an exemplary system for object packing, according to some embodiments of the present disclosure. In an embodiment, the system 100 includes a processor (s) 104, communication interface device(s), alternatively referred as input/output (I/O) interface(s) 106, and one or more data storage devices or a memory 102 operatively coupled to the processor (s) 104. In an embodiment, the processor (s) 104, can be one or more hardware processors (104). In an embodiment, the one or more hardware processors (104) can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a Graphical User Interface (GUI), and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices to one another or to another server. For example, the I/O interface 106 enables the authorized user to access the system disclosed herein through the GUI and communicate with one or more other similar systems 100.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the system 100 and methods of the present disclosure. In an embodiment, the memory 102 stores a plurality of instructions, which when executed, cause the processor(s) to perform steps involved in the process of packing the objects. Various steps involved in the process of packing the objects, which are executed by the hardware processor(s) 104 of the system 100 are explained in description of FIG. 2A through FIG. 5 with reference to the components of system 100.

Figure 2A:
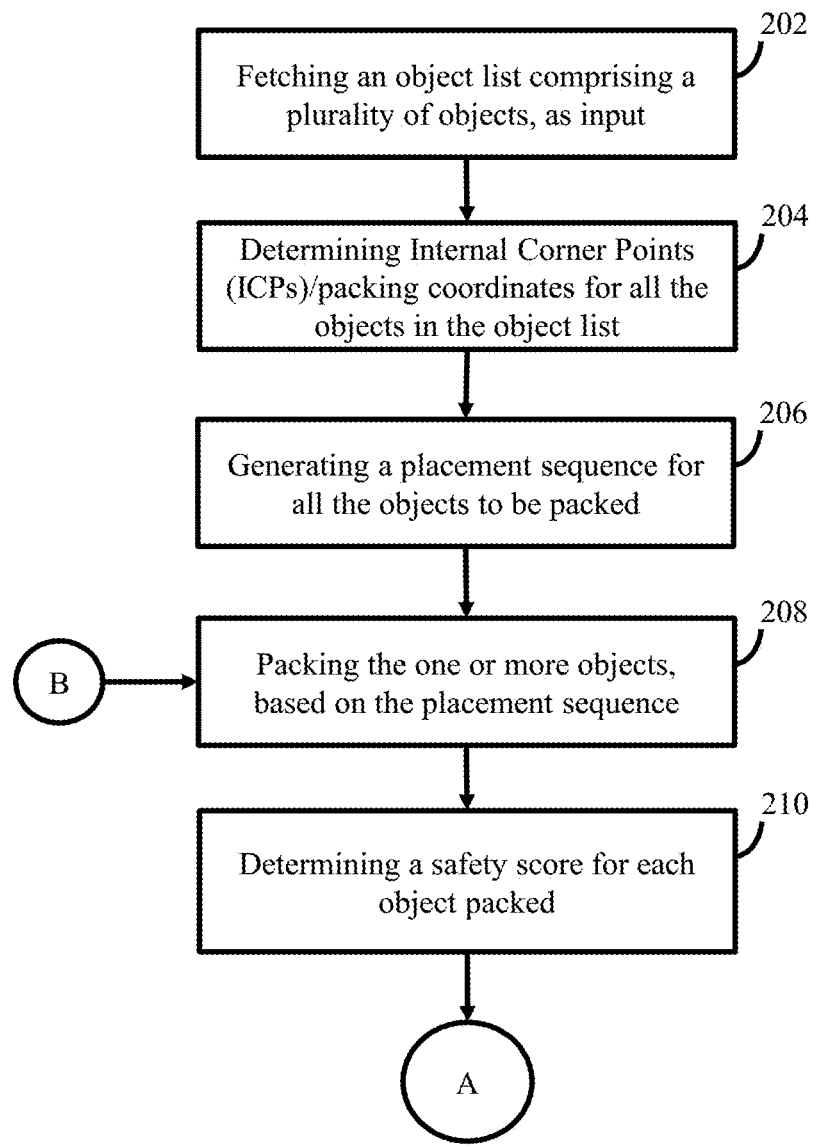
FIGS. 2A and 2B are flow diagrams depicting steps involved in the process of packing objects by the system of FIG. 1, according to some embodiments of the present disclosure.
Figure 2B:
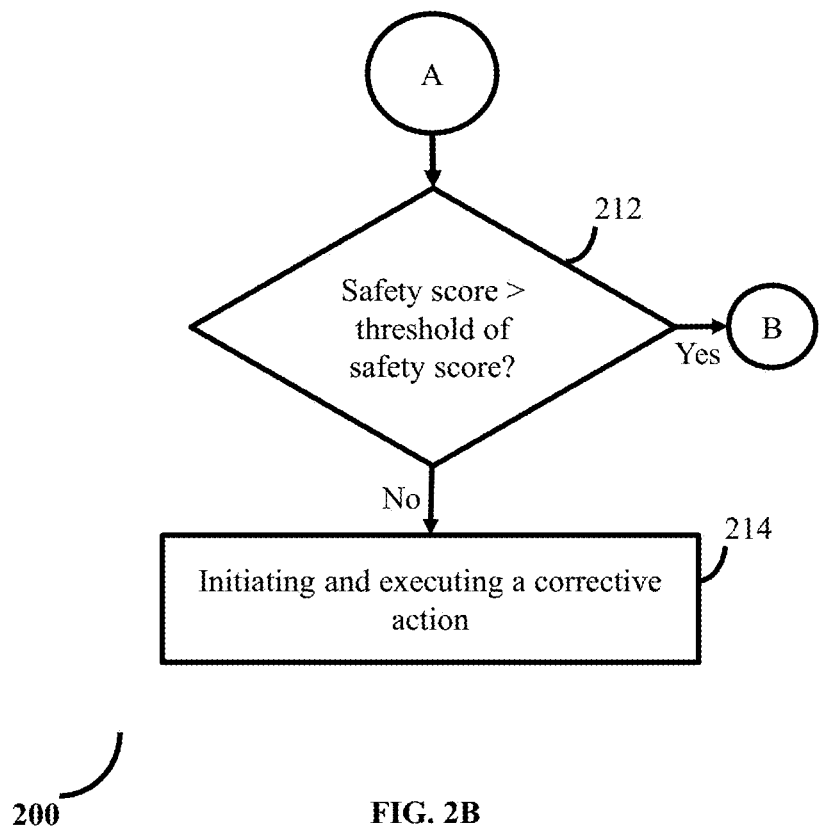
Figure 3:
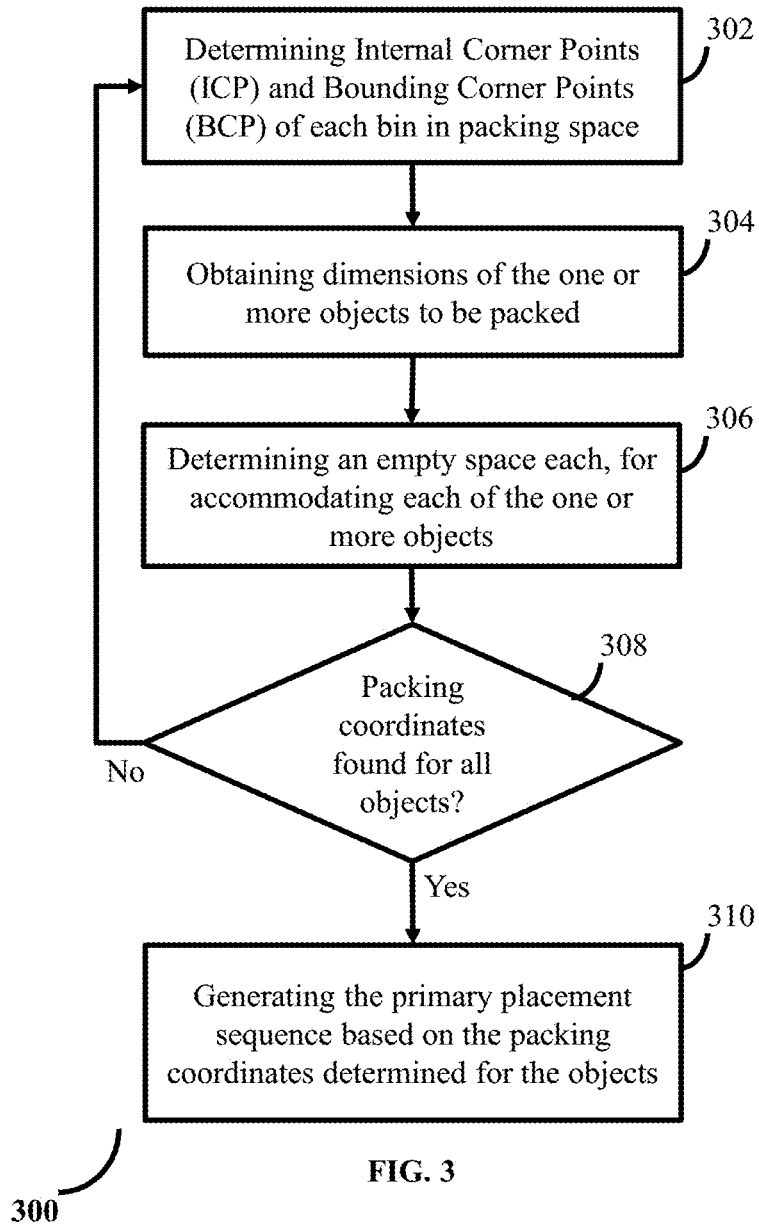
FIG. 3 is a flow diagram depicting steps involved in the process of generating a primary placement sequence by the system of FIG. 1, in accordance with some embodiments of the present disclosure.

FIGS. 2A and 2B is a flow diagram depicting steps involved in the process of packing objects by the system of FIG. 1, according to some embodiments of the present disclosure. Initially, the system 100 fetches (202) an object list as input. The object list includes unique identification (which may be a name, or a number, or a combination of alphabets, numbers, special characters and so on, which uniquely represents each object) for each of a plurality of objects, and one or more characteristics of each of the objects. The one or more characteristics of the object may be size of the object (dimensions), shape of the object, information on whether the object has to be packed or not, and so on.

For packing each of the objects in a packing space, the system 100 determines empty spaces within the packing space where each object can be packed, in terms of Internal Corner Points (ICPs). The system 100 determines/identifies the empty spaces by determining (302) Internal Corner Points (ICPs). The ICPs are potential locations in the 3D space within the packing space to place the object. The process of determining the empty spaces for placing each of the objects is explained below:

Consider that dimension of the bins are W*H*D and a list of sorted objects from among the plurality of objects is represented as 'O'. For an empty bin, ICP is initialized with (0, 0, 0) and corresponding Bounding Corner Points (BCPs) are initialized with (W*H*D). BCP for an ICP is a contiguous free space along all the three axes.

The system 100 maintains a list of ICPs (x, y, z) and corresponding BCPs (x', y', z') for each bin. The system 100 determines (304) dimensions of the object to be packed, from the characteristics of the object. An object k with dimension ($w_k$, $h_k$, $d_k$) can be placed in an ICP only if, ($x'-x \geq w_k$) and ($y'-y \geq h_k$), and ($z'-z \geq d_k$). For each object $k \varepsilon O$, the ICP 'c' that can accommodate the object is determined (306), based on the ICPs. After determining the ICPs for the object, the system 100 updates back-left-bottom coordinates of the object with coordinates of the determined empty space/bin (alternately referred to as "packing coordinates"). If the system 100 does not find any matching empty space, then the system 100 may use a new bin to place the object.

After identifying empty space and corresponding ICPs for the object, the system 100 places/packs (208) the object in the identified empty space, based on the determined ICP-BCP pair information. Placement of the object in the identified empty space may have overlapped with ICP-BCP pairs of other empty spaces in the bin. After placing an object in the determined empty space, the system 100 collects (502) information on ICP-BCP pairs of each empty space. The system 100 further determines (504) whether placement of the object has overlapped with an existing empty space, and if any such overlap is detected, then the system 100 determines (506) new ICP-BCP pairs for the remaining empty space. Some of the ICP-BCP pairs newly generated may be duplicates of the ICP-BCP pairs previously generated. Such duplicates are removed (508) to generate final set of ICP-BCP pairs. The system 100 may repeat the steps 502-508 after placement of each object according to the determined ICPs and BCPs.

If the packing coordinates for all the objects to be packed have been found, the system 100 determines (308) a dependency plan among the objects to be packed. The dependency plan represents a placement sequence generated (206), which specifies order in which the objects are to be picked and placed in the bin, and is represented using a Directed Acyclic Graph (DAG), G (V, E) with vertices V∈I, where I is the set of packed objects and edge E=(μ, v) connecting the vertices μ and v if the object μ must be placed before the object v. Before placing each object, all the ancestors as per the DAG are to be placed.

Figure 4:
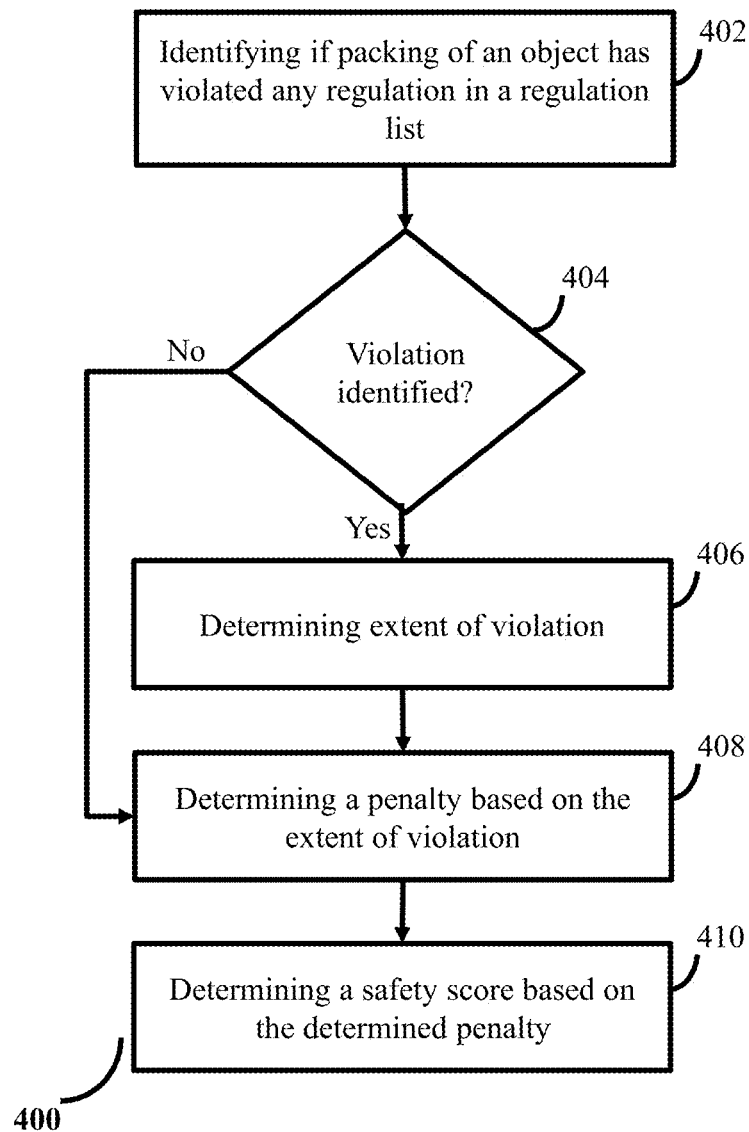
FIG. 4 is a flow diagram depicting steps involved in the process of generating a safety score for packing of each object, by the system of FIG. 1, according to some embodiments of the present disclosure.
Figure 5:
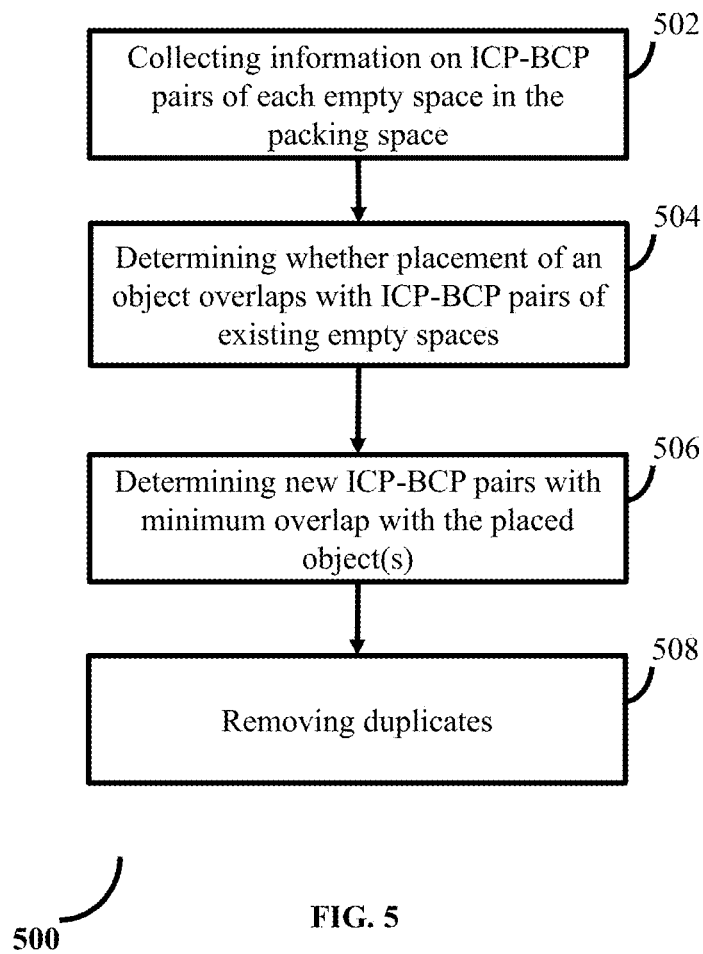
FIG. 5 is a flow diagram depicting steps involved in the process of generating Internal Corner Points (ICP)-Bounding Corner Points (BCP) pairs with placement of each object in the packing space, using the system of FIG. 1, in accordance with some embodiments of the present disclosure.
Figure 6:
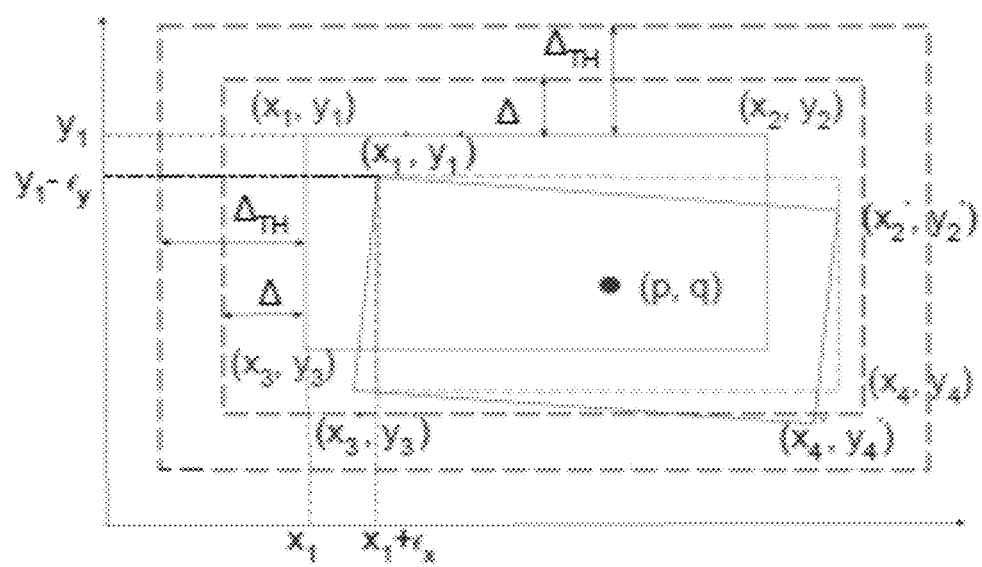
FIG. 6 is an example diagram depicting corrections executed by the system of FIG. 1, in accordance with some embodiments of the present disclosure.

After placing the object, the system 100 determines (210) a safety score for the object. A regulation list that includes a plurality of regulations to be satisfied while picking and placing an object by the robotic arm is stored in the memory 102. Steps involved in the process of generating the safety score for placement of each object are depicted in FIG. 4. The regulation list may be pre-configured or dynamically configured, by an authorized user, and may be updated dynamically when needed. An example of the regulation list is given as:

TABLE 1

| Regulation | Fault Free State | Fault Safe State | Faulty state |
|---|---|---|---|
| $R_1$ | $p_{ff}^1$ | $p_{fs}^1$ | $p_f^1$ |
| $R_2$ | $p_{ff}^2$ | $p_{fs}^2$ | $p_f^2$ |
| $R_i$ | $p_{ff}^i$ | $p_{fs}^i$ | $p_f^i$ |
| $R_k$ | $p_{ff}^k$ | $p_{fs}^k$ | $p_f^k$ |

After placing each object, the system 100 checks and identifies (402) whether the placement/packing of the object has violated any regulation in the regulation list. The regulations, when satisfied, cause the robotic arm to pick and place the objects with no deviation from the location specified by the determined ICP-BCP pairs, and the placement sequence. If there is no violation of any of the regulations $R_i$, then the system 100 is in a fault-free state, and penalty for the fault-free system is determined (408) as nil i.e. ($s_{ff}^i=1$, $p_{ff}^i=0$; $s_{fs}^i=0$, $p_{fs}^i=0$; $s_f^i=0$, $p_f^i=0$). If there is violation of one or more of the regulations, then the system 100 determines (406) the extent of violation. If the violation is within a permissible limit/tolerance limit (wherein the permissible limit is configured with the system 100), then the system 100 is considered to be in a fault-safe state, and the penalty for the fault-safe system is $p_{fs}^i$. If the violation is beyond the tolerance limit, then the system 100 is in a faulty state, and the penalty given for the faulty system is $p_f^i$. Hence, the penalty given for $i^{th}$ regulation is evaluated as:

$$P_i = p_{ff}^i * s_{ff}^i + p_{fs}^i * s_{fs}^i + p_f^i * s_f^i \quad (1)$$

such that $p_{ff}^i + p_{fs}^i + p_f^i = 1$.

Here, $s_{ff}^i$, $s_{fs}^i$, and $s_f^i$ represents probability that the system 100 is in fault-free, fault-safe, and faulty state respectively, with respect to regulation $R_i$. Based on the penalty scores, the system 100 generates (410) the safety score as:

$$C_t = 1 - \sum_{i=1}^{k} \alpha_i R_i \quad (2)$$

Where $\alpha_i$ represents a weightage given to the regulation $R_i$, and $\sum_{i=1}^{k} \alpha_i = 1$.

The system 100 also maintains a monitoring window $W_n$, during which the system 100 keeps a record of the safety score ($C_t$), and a system state ($S_t$) of last 'n' steps, wherein the value of 'n' may be pre-configured. The system state is determined from sensor readings, various software states, hardware states, and so on.

Further, a system model S, a task T, an immediate next action A, a regulation list R, and the monitoring window $W_n$ are given as input to the system 100. The system 100 initiates the action A. After execution of the action A, the system state is recorded and checked against the regulation list R. The safety score $C_t$ is evaluated and the $W_n$ is updated. Further the system 100 analyses the monitoring window. If consistent degradation of the safety score ($C_t$-$C_{t-n}$) is observed or if the safety score $C_t$ is below a given threshold $C_{th}$, then the system state of last 'n' steps are analysed to identify a probable faulty component. If the safety score is below a threshold of safety score, then the system 100 picks and executes (214) a corrective action. The corrective action corrects placement of the object in the packing space. Correcting the placement of the object involves determining new ICP-BCP pairs in comparison with current coordinates of the object, and then adjusting the alignment of the object accordingly. The corrective action may also involve re-calibrating the system 100 or one or more external hardware (for example, a robotic arm that picks and places the objects as part of the object packing) associated with the system 100, after identifying the faulty component. If the system is beyond repair, then the system 100 aborts the task.

Example Use-Case Scenario and Implementation Data:

In this example implementation, the system 100 that handles picking and placing of the objects comprises a robotic arm, a distance sensor, a camera, a conveyor belt, a set of boxes arriving one by one in the conveyor belt, and a bin used to collect the boxes, along with the system components depicted in FIG. 1. The task T comprises the following steps:

1. positioning the robotic arm in sensing position (object recognition)
2. sensing the arrival of a box in the conveyor belt using the distance sensor installed in the robotic arm
3. positioning the robotic arm in grab position
4. picking the object
5. positioning the robotic arm in drop position
6. placing the object in desired drop location inside the bin
7. initiating and executing a corrective action if needed
8. repeating the above steps until all boxes in queue are placed in the bin.

In this example, step of proper positioning of the boxes only is addressed, and remaining steps are considered error-free. The designated drop location of object 'O' is ($x_1$, $y_1$, $z_1$). In XY plane, bottom coordinates of the box are ($x_1$, $y_1$), ($x_2$, $y_2$), ($x_3$, $y_3$), and ($x_4$, $y_4$). While placing the object in the designated location, a translational error ($\epsilon_x$, $\epsilon_y$) followed by a rotational error $\theta$ counter-clockwise along the centre of gravity of the object (p, q) occurred. As a result, actual coordinates of the object are ($x_1'$, $y_1'$), ($x_2'$, $y_2'$), ($x_3'$, $y_3'$), and ($x_4'$, $y_4'$). ($x_i'$, $y_i'$) can be evaluated as in Equation (3).

$$x_1' = x_1 + \epsilon_x \qquad (3)$$
$$p = \frac{x_1 + x_2 + 2\epsilon_x}{2}$$
$$y_1' = y_1 + \epsilon_y$$
$$q = \frac{y_1 + y_2 + 2\epsilon_y}{2}$$
$$x_i' = (x_i + \epsilon_x - p)\cos(\theta) - (y_i + \epsilon_y - q)\sin(\theta) + p$$
$$y_i' = (x_i + \epsilon_x - p)\sin(\theta) - (y_i + \epsilon_y - q)\cos(\theta) + q$$

In this example, a single rule is defined in the regulation list. The rule is that bottom plane of the box should be within the tolerance bound region represented by the coordinates ($x_1-\Delta$, $y_1+\Delta$), ($x_2+\Delta$, $y_2+\Delta$), ($x_3-\Delta$, $y_3+\Delta$), and ($x_4+\Delta$, $y_4-\Delta$). If this condition is satisfied, then the system 100 is in fault-free state and the penalty given is $\rho_{ff}$. If the box is not placed within the tolerance bound region, but within a threshold-bound region, ($x_1-\Delta_{TH}$, $y_1+\Delta_{TH}$), ($x_2+\Delta_{TH}$, $y_2+\Delta_{TH}$), ($x_3-\Delta_{TH}$, $y_3-\Delta_{TH}$), and ($x_4+\Delta_{TH}$, $y_4-\Delta_{TH}$), then the system 100 is in fault-safe state, and the penalty given is $\rho_{fs}$. In this case, the system 100 executes the corrective action and makes appropriate corrections to the alignment and placing of the object. If the object is placed outside the threshold bounded region, then the system is identified as faulty, and the penalty given is $p_f$.

The monitoring window Wn is initialized with null value. The system model S, task T, action A, regulation list R, and monitoring window Wn are given as input to the system 100. The system 100 initiates action A. After execution of A, the system state is recorded. The system state takes into account the actual co-ordinates of the corners of the bottom surface of the object. The safety score is also evaluated as $C_t = 1 - \Sigma_{i=1}^n \alpha_i P_i$, where Ct refers the safety score at time instance t after executing ith action, P refers to the penalty given, and $\alpha$ represents the weighting factor. Here $P_i = p_{ff}^i * s_{ff}^i + p_{fs}^i * s_{fs}^i + p_f^i * s_f^i$ and $$\sum_{i=1}^k \alpha_i = 1.$$

The system state and the safety score for the same is then recorded in $W_n$. $W_n$ records the system state and the safety score for last 'n' actions. $W_n$ is analyzed. If the safety score, $C_i$ is less than the threshold value, $C_{th}$, then the system state is analysed to identify the fault. The system 100 identifies the fault in positioning of the boxes. According to the analyses, the system 100 is calibrated i.e., the drop location ($x_1$, $y_1$, $z_1$) are redefined as ($x_0+\delta_x$, $y_0+\delta_y$, $z_0+\delta_z$) and the next action is initiated of the task is aborted if the fault is irrepairable (for example, when the object is dropped outside the bin).

Empirical Analysis a) Dataset:

For experimental purpose, the data was generated using standard data generation techniques, and two datasets having 50 and 200 objects were considered. For each of the object sets, 9 different classes (as given in reference paper "The three-dimensional bin packing problem," Operations research, vol. 48, no. 2, pp. 256-267, 2000" by S. Martello, D. Pisinger, and D. Vigo) of datasets were generated. A 'class 10' also has been introduced, in which data is collected from real-world retail-supply-chain.

b) Object Sorting Criteria:

The objects were sorted based on the following ordering rules.

vol-d: Objects are sorted by non-increasing values of their volume ($\omega_i * h_i * d_i$) and then by non-increasing values of depth $d_i$ in case of same volume d-vol: Objects are sorted by non-increasing values of their depth $d_i$ and then by non-increasing values of their volume ($\omega_i * h_i * d_i$) in case of same depth area-d: Objects are sorted by non-increasing values of their area ($\omega_i * h_i$) and then by non-increasing values of their depth $d_i$ in case of same area area'-d: As same base area items are rare to be found, second sorting criteria given above is not often used. Instead, a clustered version of area-depth is proposed where the bin area W*H is separated into clusters defined by the intervals:

$$A_{j,\delta} = [((j-1)*WD*\delta)/100, ((j)*WD*\delta)/100] - \qquad (4)$$

d-area: Objects are sorted by their non-increasing values of depth d; and then by non-increasing values of area ($\omega_i * h_i$) in case of same depth w-h: Objects are sorted by non-increasing values of their width $\omega_i$ and then by non-increasing values of their height $h_i$ in case of same width c) Methodology:

During the experiments, the system 100 was evaluated based on (a) number of bins required to pack all objects, (b) time required to pack all the objects, and (c) percentage of task executed reliably. (b) and (c) are again compared with and without the safety score calculation and correction being carried out by the system 100. The objects were sorted and best matching ICP was selected such that the object is placed closer to base and sides of the bin, i.e. one with lowest z, y, x.

d) Inferences:

Bin-utilization—Utilizing Internal Corners: To evaluate the efficiency of the object packing being carried out by the system 100, results were compared with an extreme-point-first-fit-decreasing (EP-FFD) heuristic, based on number of bins required to pack all the objects. The comparison between the results of the system 100 (denoted by 'JP') and the EP-FFD (denoted as 'EP'), for the aforementioned sorting criteria are depicted in Table. 2.

Packing efficiency highly depends on EPs and ICPs, positioning of the objects, and amount of unused space between the objects. As the system 100 generates all the feasible EPs, packing efficiency increases. For objects of classes 1 through 5, objects are of larger size, leaving insufficient vacant space to accommodate more objects, and in that case packing efficiency of EP and JP remains same.

Packing stability: To prevent toppling of objects while packing, the system 100 generates the placement sequence such that larger objects are placed at bottom first, and smaller objects are placed on top. The packing of the objects starts by filling the bin from bottom to top giving priority to ICPs with least z, y, and x.

Figure 7A:
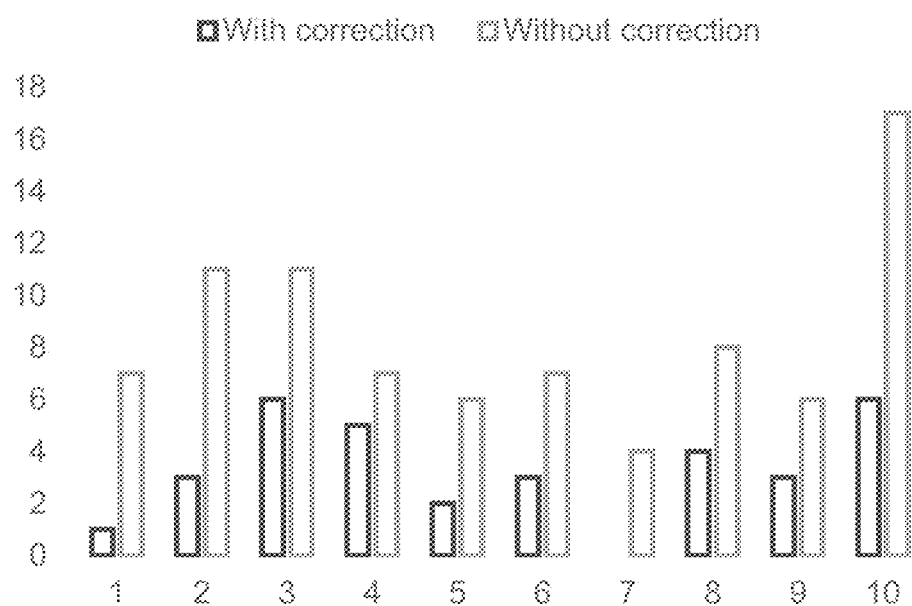
FIGS. 7A and 7B are graphs depicting number of rectification required and percentage of task completed respectively, with and without the safety score calculation and execution of the corrective measure, in accordance with some embodiments of the present disclosure.
Figure 7B:
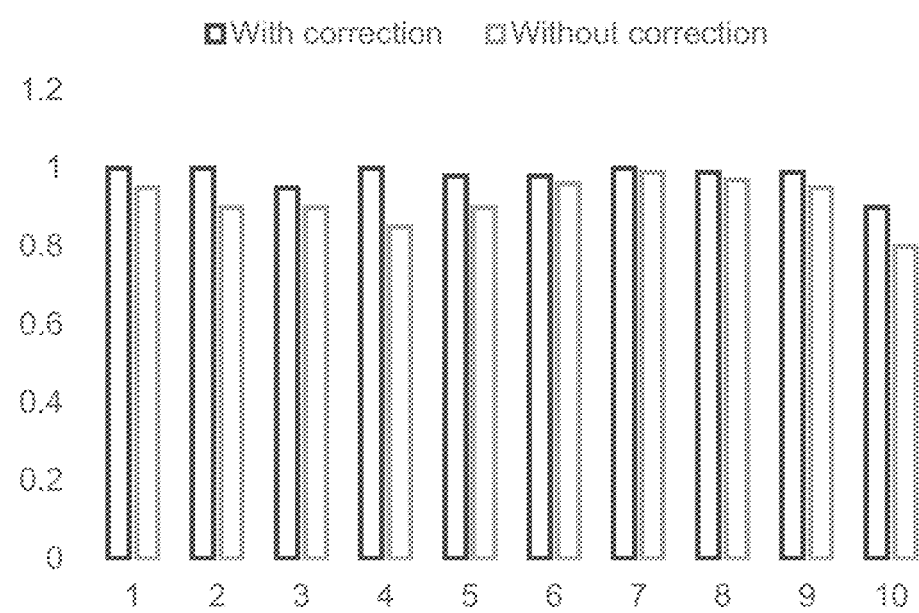

Results depicted in FIGS. 7A and 7B indicate advantage in terms of number of rectifications required and percentage of task completed, in comparison with EP. The percentage of task completion represents number of objects placed within a tolerance bound region. The results indicate that the overall performance of the system is improved with the error detection and correction applied.

TABLE 2

Bin utilization comparison of JP and EP for all objects and W = H = D

| Bin class | Bin dim | no. of objects | vol d | | d vol | | area d | | area' d | | d area | | W h | |
|---|---|---|---|---|---|---|---|---|---|---|---|---|---|---|
| | | | EP | JP | EP | JP | EP | JP | EP | JP | EP | JP | EP | JP |
| 1 | 100 | 50 | 16 | 16 | 17 | 17 | 15 | 15 | 16 | 16 | 17 | 17 | 16 | 16 |
| | | 200 | 47 | 47 | 52 | 52 | 49 | 49 | 50 | 50 | 52 | 52 | 50 | 50 |
| 2 | 100 | 50 | 16 | 16 | 16 | 16 | 16 | 16 | 15 | 15 | 16 | 16 | 17 | 17 |
| | | 200 | 50 | 50 | 51 | 51 | 53 | 53 | 51 | 51 | 51 | 51 | 53 | 53 |
| 3 | 100 | 50 | 15 | 15 | 16 | 16 | 15 | 15 | 16 | 16 | 16 | 16 | 16 | 16 |
| | | 200 | 51 | 51 | 56 | 56 | 53 | 53 | 53 | 53 | 56 | 56 | 55 | 55 |
| 4 | 100 | 50 | 27 | 27 | 27 | 27 | 27 | 27 | 27 | 27 | 27 | 27 | 27 | 27 |
| | | 200 | 114 | 114 | 116 | 116 | 114 | 114 | 114 | 114 | 116 | 116 | 115 | 115 |
| 5 | 100 | 50 | 12 | 12 | 12 | 12 | 11 | 11 | 11 | 11 | 12 | 12 | 12 | 12 |
| | | 200 | 29 | 29 | 33 | 33 | 32 | 32 | 31 | 31 | 33 | 33 | 33 | 33 |
| 6 | 10 | 50 | 12 | 12 | 12 | 12 | 13 | 13 | 13 | 13 | 12 | 12 | 13 | 13 |
| | | 200 | 35 | 35 | 36 | 36 | 37 | 37 | 37 | 37 | 36 | 36 | 37 | 37 |
| 7 | 40 | 50 | 10 | 10 | 10 | 10 | 10 | 10 | 11 | 10 | 10 | 10 | 11 | 11 |
| | | 200 | 25 | 25 | 27 | 27 | 26 | 26 | 26 | 25 | 27 | 27 | 27 | 27 |
| 8 | 100 | 50 | 10 | 10 | 11 | 11 | 11 | 11 | 11 | 11 | 11 | 11 | 11 | 11 |
| | | 200 | 31 | 31 | 35 | 35 | 32 | 32 | 32 | 32 | 35 | 35 | 34 | 34 |
| 9 | 100 | 50 | 4 | 4 | 5 | 5 | 5 | 5 | 5 | 5 | 5 | 5 | 4 | 4 |
| | | 200 | 5 | 5 | 4 | 4 | 6 | 4 | 4 | 4 | 4 | 4 | 5 | 5 |
| 10 | 60 | 50 | 1 | 1 | 1 | 1 | 1 | 1 | 1 | 1 | 1 | 1 | 1 | 1 |
| | | 200 | 2 | 2 | 2 | 1 | 2 | 2 | 1 | 1 | 2 | 1 | 2 | 1 |

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for bin packing, comprising:
    fetching an object list as input, using one or more hardware processors, wherein the object list comprises a plurality of objects and one or more characteristics of each of the plurality of objects;
    determining the plurality of objects to be packed in a packing space using the one or more hardware processors, from among the plurality of objects, based on the one or more characteristics of each of the plurality of objects;
    generating a primary placement sequence for the plurality of objects to be packed in the packing space, using the one or more hardware processors, wherein generating the primary placement sequence comprises:
        determining Internal Corner Points (ICP) and Bounding Corner Points (BCP) of each bin from among a plurality of bins in the packing space;
        obtaining dimensions of the plurality of objects to be packed;
    determining a bin among the plurality of bins, that can accommodate each of the plurality of objects, based on the dimensions of at least one object from the plurality of objects and the ICPs and BCPs of the bin, wherein determining the ICPs comprises:
        collecting information pertaining to ICPs and BCPs of empty spaces existing in the packing space, after placement of the object in the packing space;
        determining whether the placed object overlaps with one or more of the existing empty spaces;
        determining new ICP-BCP pairs with minimal overlap with the placed object, if the placed object is determined as having overlap with one or more of the existing empty spaces; and removing duplicate ICP-BCP pairs from among the determined ICP-BCP pairs and updating back-left bottom co-ordinates of the placed object with co-ordinates of the determined empty space or bin and if no matching empty space is found, a new bin is used to place the object; and generating the primary placement sequence based on the bin determined for each object and packing coordinates of each of the plurality of bins;

determining a dependency plan if the packing coordinates of the plurality of objects are found, wherein the dependency plan represents a placement sequence generated which specifies order in which the one or more objects are to be picked and placed in the bin, and wherein the dependency plan using a Directed Acyclic Graph (DAG), G (V, E) with vertices V∈I, where I refers to a set of packed objects and edge E=(μ,ν) connecting the vertices μ and ν if the object μ must be placed before the object ν;

packing the plurality of objects based on the primary placement sequence and as per the DAG, using the one or more hardware processors;

determining a safety score for the packing of each of the one or more objects, using the one or more hardware processors;

determining whether the determined safety score of each of the one or more objects exceeds a threshold of safety score, using the one or more hardware processors and creating a regulation list which includes a plurality of regulations to be satisfied while picking and placing said at least one object by a robotic arm, wherein the regulation list is pre-configured or dynamically configured by an authorized user and is dynamically updated when required;

maintaining a monitoring window Wn, to keep a record of the determined safety score, and a system state (St), wherein the system state is determined from sensor readings, one or more software states, and hardware states;

executing a corrective action if the determined safety score is below the threshold of safety score using the one or more hardware processors, wherein the corrective action corrects placement of said at least one object in the packing space and re-calibrating one or more hardware components after identifying a faulty component and if the one or more hardware components are beyond repair, then the corrective action is aborted; and preventing toppling of the plurality of objects while packing based on the generated primary placement sequence such that larger objects are placed first at bottom and smaller objects are placed on top, wherein the packing of objects starts by filling the bin from bottom to top giving priority to ICPs with least z, y and x.

2. The processor-implemented method as claimed in claim 1, wherein correcting placement of the object comprising:
determining new ICPs for placing the object to match a determined ICP-BCP pair of an empty space determined for the object;
changing current alignment of the object to match the determined new ICP-BCP pair; and
calibrating the one or more hardware components responsible for handling alignment of the object.

3. The processor-implemented method as claimed in claim 1, wherein determining the safety score comprises:
identifying whether packing of the object has violated one or more regulations in the regulation list;
determining extent of violation if the packing of the object is identified to have violated one or more of the regulations;
determining a penalty based on the determined extent of violation; and
determining the safety score based on the determined penalty for the identified one or more violations.

4. A system for bin packing, comprising:
one or more communication interfaces;
one or more hardware processors; and
a memory storing a plurality of instructions, wherein the plurality of instructions when executed, cause the one or more hardware processors to:
fetch an object list as input, wherein the object list comprises a plurality of objects and one or more characteristics of each of the plurality of objects;
determine one or more objects to be packed in a packing space, from among the plurality of objects, based on the one or more characteristics of each of the plurality of objects;
generate a primary placement sequence for the plurality of objects to be packed in the packing space, wherein generating the primary placement sequence comprises:
determining Internal Corner Points (ICP) and a Bounding Corner Points (BCP) of each bin from among a plurality of bins in the packing space;
obtaining dimensions of the plurality of the objects to be packed;
determining a bin among the plurality of bins, that can accommodate each of the plurality of objects, based on the dimensions of at least one object from the plurality of objects and the ICPs and BCPs of the bin, wherein determining the ICPs comprises:
collecting information pertaining to ICPs and BCPs of empty spaces existing in the packing space, after placement of the object in the packing space;
determining whether the placed object overlaps with one or more of the existing empty spaces;
determining new ICP-BCP pairs with minimal overlap with the placed object, if the placed object is determined as having overlap with one or more of the existing empty spaces; and
removing duplicate ICP-BCP pairs from among the determined ICP-BCP pairs and updating back-left bottom co-ordinates of the placed object with co-ordinates of the determined empty space or bin and if no matching empty space is found, a new bin is used to place the object; and
generating the primary placement sequence based on the bins determined for said at least one object and packing coordinates of each of the bins;
determining a dependency plan if the packing coordinates of the plurality of objects are found, wherein the dependency plan represents a placement sequence generated which specifies order in which the plurality of objects are to be picked and placed in the bin, and wherein the dependency plan using a Directed Acyclic Graph (DAG), G (V, E) with vertices V∈I, where I refers to a set of packed objects and edge E=(μ,ν) connecting the vertices μ and ν if the object μ must be placed before the object ν;
pack the plurality of objects based on the primary placement sequence;
determine a safety score for the packing of each object of the plurality of objects;

determine whether the determined safety score of each
object of the plurality of objects exceeds a threshold of
safety score and create a regulation list which includes
a plurality of regulations to be satisfied while picking
and placing said at least one object by a robotic
arm, wherein the regulation list is pre-configured or dynamically configured by an authorized user and is dynamically updated when required;

maintain a monitoring window Wn, to keep a record of the
determined safety score, and a system state (St),
wherein the system state is determined from sensor
readings, one or more software states, and hardware
states; and execute a corrective action if the determined safety score
is below the threshold of safety score, wherein the
corrective action corrects placement of said at least one
object in the packing space and re-calibrating one or
more hardware components after identifying a faulty
component and if the one or more hardware components are beyond repair, then the corrective action is
aborted; and preventing toppling of the plurality of objects while
packing based on the generated primary placement
sequence such that larger objects are placed first at
bottom and smaller objects are placed on top, wherein
the packing of objects starts by filling the bin from
bottom to top giving priority to ICPs with least z, y and
x.

5. The system as claimed in claim 4, wherein the system corrects placement of the object by:
   determining new ICPs for placing the object to match a determined ICP-BCP pair of an empty space determined for the object;
   changing current alignment of the object to match the determined new ICP-BCP pair; and
   calibrating the one or more hardware components responsible for handling alignment of the object.

6. The system as claimed in claim 4, wherein the system determines the safety score by:
   identifying whether packing of said at least one object has violated one or more regulations in a regulation list;
   determining extent of violation if the packing of said at least one object is identified to have violated one or more of the regulations;
   determining a penalty based on the determined extent of violation; and
   determining the safety score based on the determined penalty for the identified one or more violations.

7. A non-transitory computer readable medium for bin packing, the non-transitory computer readable medium comprising a plurality of instructions, which when executed, cause one or more hardware processors to:
   fetch an object list as input, wherein the object list comprises a plurality of objects and one or more characteristics of each of the plurality of objects;
   determine the plurality of objects to be packed in a packing space, from among the plurality of objects, based on the one or more characteristics of each of the plurality of objects;
generate a primary placement sequence for the plurality of objects to be packed in the packing space, wherein generating the primary placement sequence comprises:
   determining Internal Corner Points (ICP) and a Bounding Corner Points (BCP) of each bin from among a plurality of bins in the packing space;
   obtaining dimensions of the plurality of objects to be packed;
   determining a bin among the plurality of bins, that can accommodate each of the plurality of objects, based on the dimensions of at least one object from the plurality of objects and the ICPs and BCPs of the bin, wherein determining the ICPs comprises:
      collecting information pertaining to ICPs and BCPs of empty spaces existing in the packing space, after placement of the object in the packing space;
      determining whether the placed object overlaps with one or more of the existing empty spaces;
      determining new ICP-BCP pairs with minimal overlap with the placed object, if the placed object is determined as having overlap with one or more of the existing empty spaces; and
      removing duplicate ICP-BCP pairs from among the determined ICP-BCP pairs and updating back-left bottom co-ordinates of the placed object with co-ordinates of the determined empty space or bin and if no matching empty space is found, a new bin is used to place the object; and
   generating the primary placement sequence based on the bins determined for said at least one object and packing coordinates of each of the bins;
   determining a dependency plan if the packing coordinates of the one or more objects are found, wherein the dependency plan represents a placement sequence generated which specifies order in which the plurality of objects are to be picked and placed in the bin, and wherein the dependency plan using a Directed Acyclic Graph (DAG), G (V, E) with vertices V∈I, where I is the set of packed objects and edge E=(μ,ν) connecting the vertices μ and ν if the object μ must be placed before the object ν; pack the plurality of objects based on the primary placement sequence;
   determine a safety score for the packing of each object of the plurality of objects;
   determine whether the determined safety score of each object of the plurality of objects exceeds a threshold of safety score and creating a regulation list which includes a plurality of regulations to be satisfied while picking and placing said at least one object by a robotic arm, wherein the regulation list is pre-configured or dynamically configured by an authorized user and is dynamically updated when required;
   maintaining a monitoring window Wn, to keep a record of the determined safety score, and a system state (St), wherein the system state is determined from sensor readings, one or more software states, and hardware states; and
   execute a corrective action if the determined safety score is below the threshold of safety score, wherein the corrective action corrects placement of said at least one object in the packing space and re-calibrating one or more hardware components after identifying a faulty component and if the one or more hardware components are beyond repair, then the corrective action is aborted; and
   preventing toppling of the plurality of objects while packing based on the generated primary placement sequence such that larger objects are placed first at bottom and smaller objects are placed on top, wherein the packing of objects starts by filling the bin from bottom to top giving priority to ICPs with least z, y and x.

8. The non-transitory computer readable medium as claimed in claim 7, wherein the non-transitory computer readable medium corrects placement of the object by:

determining new ICPs for placing the object to match a determined ICP-BCP pair of an empty space determined for the object;

changing current alignment of the object to match the determined new ICP-BCP pair; and calibrating the one or more hardware components responsible for handling alignment of the object.

9. The non-transitory computer readable medium as claimed in claim 7, wherein the non-transitory computer readable medium determines the safety score by:

identifying whether packing of said at least one object has violated one or more regulations in a regulation list;

determining extent of violation if the packing of said at least one object is identified to have violated one or more of the regulations;

determining a penalty based on the determined extent of violation; and determining the safety score based on the determined penalty for the identified one or more violations.

\* \* \* \* \*